(12) United States Patent
Sato et al.

(10) Patent No.: US 10,228,749 B2
(45) Date of Patent: Mar. 12, 2019

(54) POWER SAVING APPARATUS, METHOD, AND NON-TRANSITORY COMPUTER-READABLE MEDIUM USING A PRE-CALCULATED SNMP GETNEXT REQUEST CORRESPONDENCE TABLE

(71) Applicant: CANON KABUSHIKI KAISHA, Tokyo (JP)

(72) Inventors: Haruki Sato, Tokyo (JP); Tomohiro Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 14/709,832

(22) Filed: May 12, 2015

(65) Prior Publication Data
US 2015/0338906 A1    Nov. 26, 2015

(30) Foreign Application Priority Data

May 20, 2014    (JP) ................. 2014-104513

(51) Int. Cl.
*G06F 1/32* (2006.01)
*G06F 1/3287* (2019.01)
(Continued)

(52) U.S. Cl.
CPC ............ *G06F 1/3287* (2013.01); *B41J 29/38* (2013.01); *G06F 1/3243* (2013.01);
(Continued)

(58) Field of Classification Search
CPC ........ G06F 1/32; G06F 1/3203; G06F 1/3284; G06F 1/3293; Y02B 60/121; Y02B 60/1267
See application file for complete search history.

(56) References Cited

U.S. PATENT DOCUMENTS 6,317,748 B1 *  11/2001  Menzies ........... G06F 17/30569
6,728,768 B1 *   4/2004  Carney .............. H04L 41/0213
                                                          707/999.2
(Continued)

FOREIGN PATENT DOCUMENTS

JP     2006-259906 A    9/2006
JP     2012-227730 A    11/2012

OTHER PUBLICATIONS

Mauro, Douglas, and Kevin Schmidt. Essential SNMP, 2nd Edition. O'Reilly Media, Inc., Sep. 21, 2005. Web. Feb. 7, 2017. <http://techbus.safaribooksonline.com/book/networking/snmp/0596008406>.*

(Continued)

*Primary Examiner* — Jaweed A Abbaszadeh
*Assistant Examiner* — Brian J Corcoran
(74) *Attorney, Agent, or Firm* — Venable LLP

(57) ABSTRACT

An information processing apparatus comprises: a power control unit that, when the information processing apparatus operates in a first power mode, controls to supply power to both a first control unit and a second control unit, and when the information processing apparatus operates in a second power mode in which a power consumption is smaller than that in the first power mode, controls to supply power to the second control unit, wherein when the information processing apparatus operates in the second power mode, the second control unit can respond to a status request of a first type in which specific identification information is designated and a status request of a second type in which specific identification information is designated while maintaining the second power mode.

12 Claims, 11 Drawing Sheets

| FIRST GetNextRequest OID | LAST GetNextRequest OID | OID | IMPLEMENTATION VALUE | IMPLEMENTATION PRESENCE/ABSENCE |
|---|---|---|---|---|
| 1 | 1.1 | 1.1.1 | a | yes |
| 1.1.1 | 1.2 | 1.2.1 | b | yes |
| - | - | 1.2.2 | - | no |
| 1.2.2 | 1.3.1 | 1.3.1.1 | d | yes |
| - | - | 1.3.1.2 | - | no |
| 1.3.1.1 | 1.3.1.2 | 1.3.1.3 | e | yes |
| 1.3.2.2 | 1.3.2.2 | 1.3.2.3 | h | yes |

(51) Int. Cl.
*G06F 1/3296* (2019.01)
*G06F 1/3234* (2019.01)
*B41J 29/38* (2006.01)
*H04N 1/00* (2006.01)
*G06F 3/12* (2006.01)

(52) U.S. Cl.
CPC .......... *G06F 1/3296* (2013.01); *G06F 3/1221* (2013.01); *G06F 3/1229* (2013.01); *G06F 3/1236* (2013.01); *G06F 3/1285* (2013.01); *H04N 1/00904* (2013.01); *Y02D 10/1592* (2018.01)

(56) References Cited

U.S. PATENT DOCUMENTS

| | | |
|---|---|---|
| 6,823,092 B1 | 11/2004 | Sato |
| 7,190,482 B2 | 3/2007 | Sato |
| 7,555,662 B2 | 6/2009 | Kidoguchi |
| 2002/0032761 A1* | 3/2002 | Aoyagi .............. H04L 12/462 709/223 |
| 2003/0023605 A1* | 1/2003 | Sternin .............. H04L 41/024 |
| 2011/0078464 A1* | 3/2011 | Yokomizo .......... G06F 1/3203 713/300 |
| 2012/0198037 A1* | 8/2012 | Shelby .............. H04L 41/0213 709/223 |
| 2013/0046967 A1* | 2/2013 | Fullerton .......... H03K 3/0315 713/100 |
| 2015/0121102 A1* | 4/2015 | Sasadai ............ G06F 1/3209 713/320 |

OTHER PUBLICATIONS

Blank-Edelman, David N. "Appendix G. The 20-Minute SNMP Tutorial" Automating System Administration with Perl:. Sebastopol, CA: O'Reilly, 2009. N. pag. Safari Books Online. O'Reilly, May 29, 2009. Web. Jun. 28, 2017. <http://techbus.safaribooksonline.com/book/programming/perl/9780596801892>.*

* cited by examiner

FIG. 4

| Protocol Data Unit (400) | | | | | | | | |
|---|---|---|---|---|---|---|---|---|
| PDU Type | Request ID | Error Status | Error Index | Variable Binding List (405) | | | | |
| | | | | Object ID | Value | Object ID | Value | ...... |
| 401 | 402 | 403 | 404 | 406 | 407 | 408 | 409 | 410 411 |

| OID | IMPLEMENTATION VALUE |
|---|---|
| 1.1.1 | a |
| 1.2.1 | b |
| 1.2.2 | c |
| 1.3.1.1 | d |
| 1.3.1.3 | e |
| 1.3.2.1 | f |
| 1.3.2.2 | g |
| 1.3.2.3 | h |
| 1.3.3 | i |

FIG. 8

| FIRST GetNextRequest OID | LAST GetNextRequest OID | OID | IMPLEMENTATION VALUE | IMPLEMENTATION PRESENCE/ABSENCE |
|---|---|---|---|---|
| 1 | 1.1 | 1.1.1 | a | yes |
| 1.1.1 | 1.2 | 1.2.1 | b | yes |
| - | - | 1.2.2 | - | no |
| 1.2.2 | 1.3.1 | 1.3.1.1 | d | yes |
| - | - | 1.3.1.2 | - | no |
| 1.3.1.1 | 1.3.1.2 | 1.3.1.3 | e | yes |
| 1.3.2.2 | 1.3.2.2 | 1.3.2.3 | h | yes |

FIG. 11

| GetNextRequest OID 1101 | OID 1102 | IMPLEMENTATION VALUE 1103 | IMPLEMENTATION PRESENCE/ABSENCE 1104 |
|---|---|---|---|
| 1.1 | 1.1.1 | a | yes |
| 1.2 | 1.2.1 | b | yes |
| - | 1.2.3 | - | no |
| 1.3 | 1.3.1.1 | d | yes |
| - | 1.3.1.2 | - | no |
| 1.3.1.2 | 1.3.1.3 | e | yes |
| 1.3.2.2 | 1.3.2.3 | h | yes |

POWER SAVING APPARATUS, METHOD, AND NON-TRANSITORY COMPUTER-READABLE MEDIUM USING A PRE-CALCULATED SNMP GETNEXT REQUEST CORRESPONDENCE TABLE

BACKGROUND OF THE INVENTION

Field of the Invention

The present invention relates to an information processing apparatus, a control method for the information processing apparatus, and a non-transitory computer-readable medium.

Description of the Related Art

There has been an increasing demand for reducing the power consumption of an information processing apparatus such as a printer or digital multi function peripheral. To meet this demand, for example, there is known a technique of causing the information processing apparatus to transit from a normal power mode to a power saving mode if the information processing apparatus has not operated for a predetermined time.

For example, Japanese Patent Laid-Open Nos. 2006-259906 and 2012-227730 disclose techniques for maintaining the power saving mode. Japanese Patent Laid-Open No. 2006-259906 describes an information processing apparatus including a control unit at the time of a normal operation and a control unit at the time of power saving. In the normal power mode, the control unit at the time of the normal operation responds to a packet received from an external apparatus. In the power saving mode, the control unit at the time of power saving sends a response (proxy response) to a received packet instead of the control unit at the time of the normal operation. Since the control unit at the time of power saving responds to a request periodically transmitted by the external apparatus, the information processing apparatus can maintain the power saving mode, thereby reducing the power consumption of the overall information processing apparatus.

An example of the packet of the request periodically transmitted by the external apparatus is a status obtaining request by SNMP (Simple Network Management Protocol). The SNMP is used by the external apparatus to obtain information of the information processing apparatus on a network. An SNMP agent as a device which responds to an obtaining request by the SNMP is managed in a database having a tree structure called a MIB (Management Information Base). Each entry of the MIB is managed by an object ID (to be referred to as an OID hereinafter) as a unique identifier. In the SNMP, there are a GetRequest command for requesting information linked with a designated OID, and a GetNextRequest command for requesting an OID positioned next to a designated OID and information linked with the OID. Japanese Patent Laid-Open No. 2012-227730 describes a technique of sending a proxy respond to an SNMP GetRequest command by deciding an OID for which a proxy response should be sent in response to a status request by a GetRequest command, and holding the decided OID and information linked with it in a communication unit.

In the technique disclosed in Japanese Patent Laid-Open No. 2012-227730 described above, the communication unit holds only an OID and information linked with it, and holds no information indicating the position of the OID on a MIB tree managed by the information processing apparatus. Consequently, the communication unit can respond to only a GetRequest command for an OID registered in advance, and cannot respond to a GetNextRequest command. In addition, since the communication unit has no information of an OID which is not implemented by the information processing apparatus, it cannot send an error response to a GetRequest command for such OID. Therefore, when a status request by a GetNextRequest command or a status request for an OID which is not implemented by the information processing apparatus is received, the information processing apparatus needs to transit from the power saving mode to the normal power mode. As a result, it is impossible to sufficiently benefit from the power saving mode of reducing the power consumption.

SUMMARY OF THE INVENTION

The present invention has been made in consideration of the above problem, and makes it possible to maintain the power saving mode of the information processing apparatus even when a request is received from the external apparatus.

According to one aspect of the present invention, there is provided an information processing apparatus operable in a first power mode and a second power mode in which a power consumption is smaller than that in the first power mode, comprising: a first control unit; a second control unit; and a power control unit configured to, when the information processing apparatus operates in the first power mode, control to supply power to both the first control unit and the second control unit, and when the information processing apparatus operates in the second power mode, control to supply power to the second control unit without supplying power to the first control unit, wherein when the information processing apparatus operates in the second power mode, the second control unit can respond to a status request of a first type in which specific identification information is designated and a status request of a second type in which specific identification information is designated while maintaining the second power mode, the status request of the first type is a request to obtain an implementation value of a node indicated by the identification information designated in the status request, and the status request of the second type is a request to obtain an implementation value of a node next to a node indicated by the identification information designated in the status request.

According to another aspect of the present invention, there is provided a control method for an information processing apparatus operable in a first power mode and a second power mode in which a power consumption is smaller than that in the first power mode, the information processing apparatus including a first control unit, and a second control unit, the method comprising: a power control step of, when the information processing apparatus operates in the first power mode, controlling to supply power to both the first control unit and the second control unit, and when the information processing apparatus operates in the second power mode, controlling to supply power to the second control unit without supplying power to the first control unit, wherein when the information processing apparatus operates in the second power mode, the second control unit can respond to a status request of a first type in which specific identification information is designated and a status request of a second type in which specific identification information is designated while maintaining the second power mode, the status request of the first type is a request to obtain an implementation value of a node indicated by the identification information designated in the status request, and the status request of the second type is a request to obtain an implementation value of a node next to a node indicated by the identification information designated in the status request.

According to one aspect of the present invention, there is provided a non-transitory computer-readable medium storing a program for causing a computer including a first control unit and a second control unit to function as a power control unit configured to, when the computer operates in a first power mode, control to supply power to both the first control unit and the second control unit, and when the computer operates in a second power mode in which a power consumption is smaller than that in the first power mode, control to supply power to the second control unit without supplying power to the first control unit, wherein when the computer operates in the second power mode, the second control unit can respond to a status request of a first type in which specific identification information is designated and a status request of a second type in which specific identification information is designated while maintaining the second power mode, the status request of the first type is a request to obtain an implementation value of a node indicated by the identification information designated in the status request, and the status request of the second type is a request to obtain an implementation value of a node next to a node indicated by the identification information designated in the status request.

According to the present invention, it is possible to maintain the power saving mode of an information processing apparatus even when a request is received from an external apparatus.

Further features of the present invention will become apparent from the following description of exemplary embodiments (with reference to the attached drawings).

BRIEF DESCRIPTION OF THE DRAWINGS

FIG. 4 is a table showing an example of the data structure of an SNMP message;

FIG. 8 is a table showing an SNMP response information table according to the first embodiment;

FIG. 11 is a table showing an SNMP response information table according to the second embodiment.

DESCRIPTION OF THE EMBODIMENTS

Embodiments of the present invention will be described below with reference to the accompanying drawings. Note that the following embodiments do not limit the present invention according to the scope of the appended claims, and all combinations of characteristic features described in the embodiments are not always essential to solving unit of the invention.

First Embodiment

[System Configuration]

Figure 1:
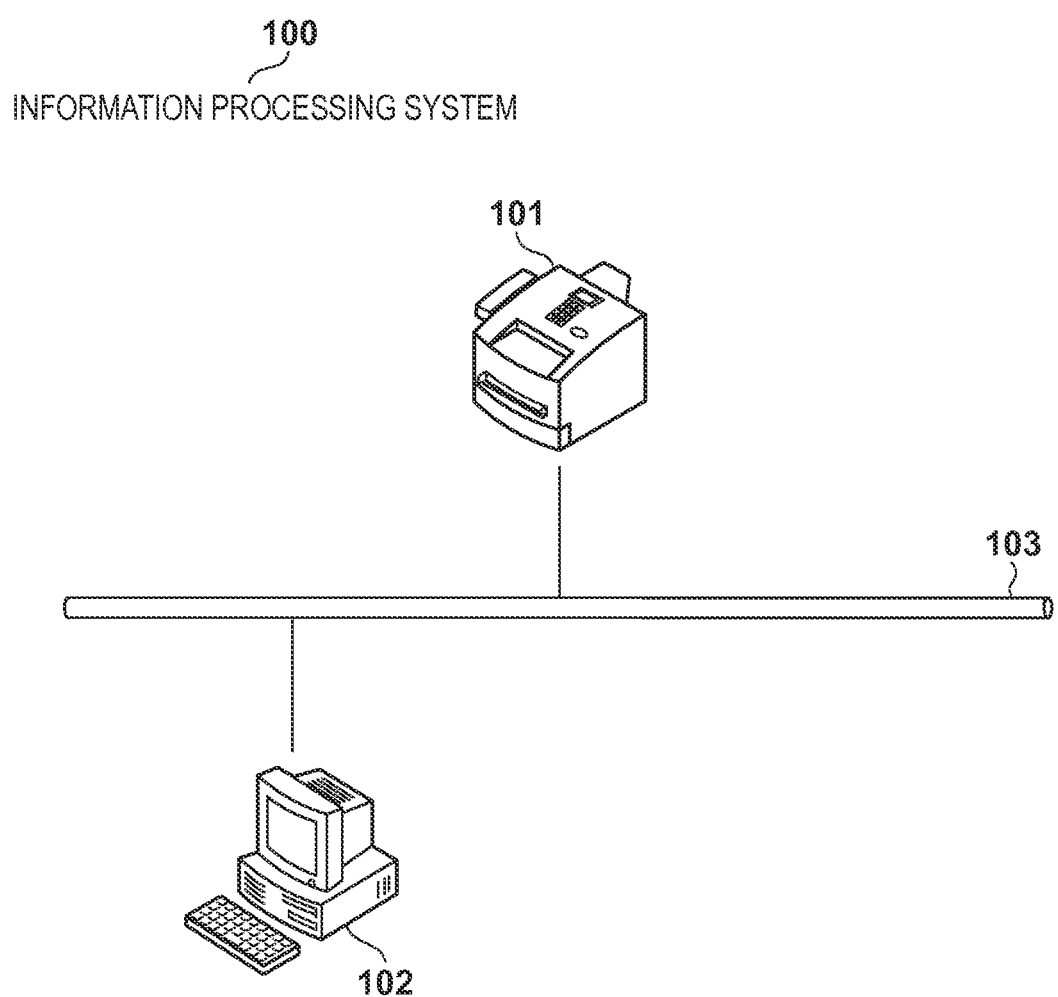
FIG. 1 is a view showing an example of the configuration of an information processing system.

The configuration of an information processing system 100 according to this embodiment will be described with reference to FIG. 1. The information processing system 100 includes an information processing apparatus 101 and a PC (Personal Computer) 102. The information processing apparatus 101 and the PC 102 are interconnected via a network 103. The PC 102 operates as an SNMP manager, and the information processing apparatus 101 operates as an SNMP agent. Note that FIG. 1 shows one information processing apparatus 101 and one PC 102. The present invention, however, is not limited to this, and the information processing system 100 may include a plurality of apparatuses. In this case, for example, the PC 102 may function as a management apparatus for managing the statuses of the plurality of information processing apparatuses 101.

[Hardware Arrangement]

Figure 2:
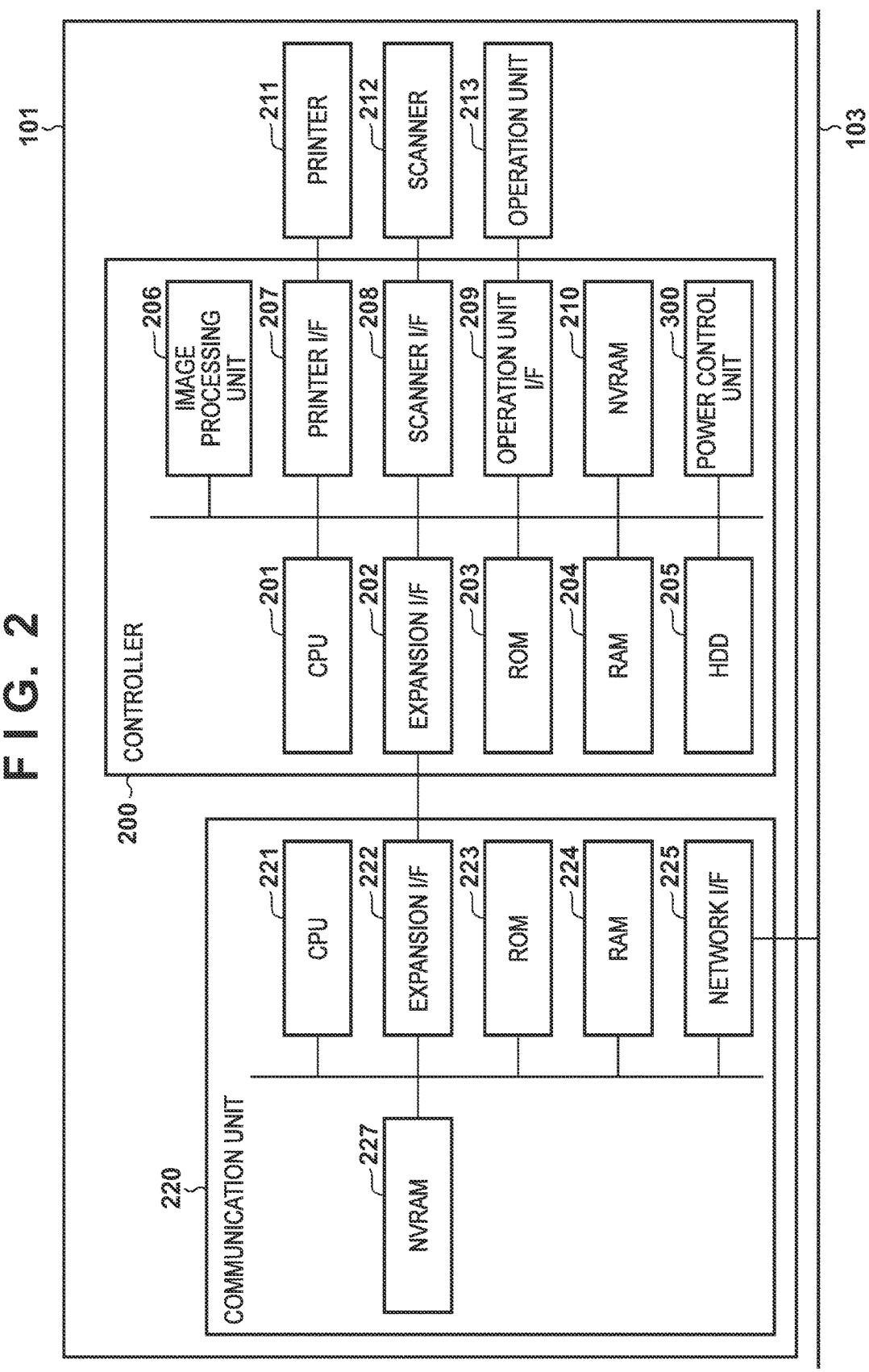
FIG. 2 is a block diagram showing an example of the hardware arrangement of the information processing apparatus.

An example of the hardware arrangement of the information processing apparatus 101 will be described with reference to FIG. 2. In this embodiment, as the information processing apparatus 101, a digital multi function peripheral such as an MFP (Multi Function Peripheral) having the copy function, print function, scan function, and transmission function will be exemplified. The information processing apparatus 101 need not have all the above-described functions, and may have at least one of the above-described functions or additionally have another function.

The information processing apparatus 101 includes a controller 200, a communication unit 220, a printer 211, a scanner 212, and an operation unit 213. The controller 200 includes a CPU 201, a ROM 203, a RAM 204, an HDD 205, an image processing unit 206, a printer I/F 207, a scanner I/F 208, an operation unit I/F 209, an NVRAM 210, and a power control unit 300. The respective units except for the communication unit 220 are communicably connected to each other via a bus. The communication unit 220 is communicably connected to each unit of the controller 200 via an expansion I/F 202 and the bus.

The CPU 201 reads out a control program stored in the ROM 203, and controls the overall operation of the information processing apparatus 101. The RAM 204 is a volatile storage unit, and is used by the CPU 201 as a main memory and a temporary storage area such as a work area. The HDD 205 is used as a storage area for storing various kinds of information such as font data, emulation programs, and form data. The NVRAM 210 is a nonvolatile memory, and stores various kinds of information. Note that the controller 200 of the information processing apparatus 101 has the arrangement in which the one CPU 201 executes respective processes shown in flowcharts (to be described later) using one storage unit (RAM 204 or HDD 205) but may adopt another arrangement. For example, a plurality of CPUs and a plurality of RAMs or HDDs may cooperate with each other to execute the respective processes shown in the flowcharts (to be described later).

The image processing unit 206 is a portion for performing image processing. The image processing unit 206 reads out image data stored in the RAM 204, and performs image processing such as color adjustment and enlargement or reduction like JPEG or JBIG. The printer I/F 207 connects the controller 200 and the printer 211. The printer 211 executes print processing based on a print job and image data generated by the scanner 212. Image data to be printed by the printer 211 is transferred from the controller 200 to the printer 211 via the printer I/F 207. The scanner I/F 208 connects the controller 200 and the scanner 212. The scanner 212 generates image data by reading a document. The image data generated by the scanner 212 is transferred to the controller 200 via the scanner I/F 208. The operation unit I/F 209 connects the controller 200 and the operation unit 213. The operation unit 213 includes a keyboard and a liquid crystal display unit having a touch panel function. Information input by the user by using the operation unit 213 is transferred to the controller 200 via the operation unit I/F 209. Based on an instruction accepted from the CPU 201 and communication unit 220, the power control unit 300 controls power supply to each unit of the information processing apparatus 101. The operation of the power control unit 300 will be described in detail later. Note that FIG. 2 shows the arrangement in which the controller 200 includes the power control unit 300. The present invention, however, is not limited to this. For example, the power control unit 300 may be included in the information processing apparatus 101 as a component different from the controller 200, and connected to the controller 200 and the communication unit 220 to control power supplied from the power supply.

The communication unit 220 will be described next. The communication unit 220 includes a CPU 221, an expansion I/F 222, a ROM 223, a RAM 224, a network I/F 225, and an NVRAM 227. The respective units are communicably connected to each other via a bus. The communication unit 220 is a NIC (Network Interface Card), and is detachable from the information processing apparatus 101. The controller 200 is communicable with an external apparatus such as the PC 102 via the communication unit 220.

The CPU 221 reads out a control program stored in the ROM 223, and controls the operation of the communication unit 220. The RAM 224 is a volatile storage unit, and is used by the CPU 221 as a main memory and a temporary storage area such as a work area. The NVRAM 227 is a nonvolatile memory, and stores various kinds of information. Note that the communication unit 220 of the information processing apparatus 101 has the arrangement in which the one CPU 221 executes respective processes shown in flowcharts (to be described later) using the one RAM 224 but may adopt another arrangement. For example, a plurality of CPUs and a plurality of RAMs may cooperate with each other to execute the respective processes shown in the flowcharts (to be described later). The network I/F 225 is connected to the network 103, and transmits/receives data to/from the external apparatus such as the PC 102. The expansion I/F 222 communicates with each unit of the controller 200.

[Power Source Arrangement and Power Mode]

Figure 3:
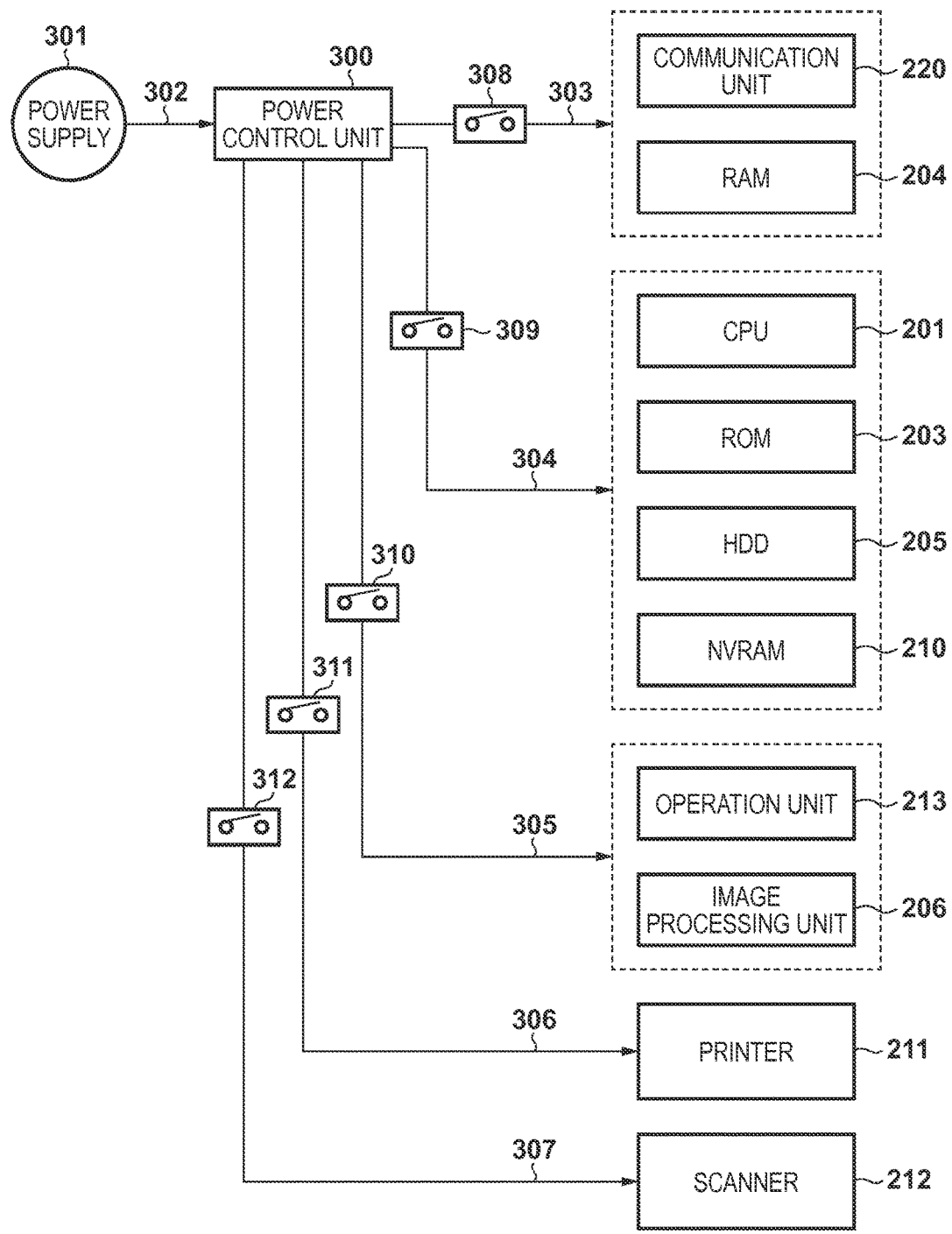
FIG. 3 is a block diagram showing an example of the power source arrangement of the information processing apparatus.

FIG. 3 is a block diagram showing an example of the power source arrangement of the information processing apparatus 101. The power control unit 300 of the information processing apparatus 101 converts AC power supplied by a power supply 301 via a power supply line 302 into DC power, and supplies the DC power to the respective units of the information processing apparatus 101 via power supply lines 303, 304, 305, 306, and 307. Switches 308, 309, 310, 311, and 312 are provided on the power supply lines 303, 304, 305, 306, and 307, respectively. The power control unit 300 controls each switch to switch from an ON state to an OFF state or from the OFF state to the ON state.

The power modes of the information processing apparatus 101 will be described. In this embodiment, the information processing apparatus 101 has two power modes, that is, the normal power mode and power saving mode. Note that in this specification, for the sake of convenience, the power saving mode will also be referred to as the "first power mode" hereinafter and the normal power mode will also be referred to as the "second power mode" hereinafter.

If the information processing apparatus 101 operates in the normal power mode, the power control unit 300 supplies power to the respective units of the information processing apparatus 101. At this time, the switches 308 to 312 are set in the ON state. In the normal power mode, power may be always supplied to the operation unit 213, image processing unit 206, printer 211, and scanner 212. If any one of the image processing unit 206, printer 211, scanner 212, and operation unit 213 is not used in the normal power mode, the switches 310 to 312 may be switched to the OFF state, thereby interrupting power supply to the unused unit. That is, the normal power mode is a power mode in which the power control unit 300 supplies power to at least the RAM 204, CPU 201, ROM 203, HDD 205, NVRAM 210, and communication unit 220.

On the other hand, if the information processing apparatus 101 operates in the power saving mode, the power control unit 300 supplies power to the communication unit 220 and RAM 204. However, power supply to the CPU 201, ROM 203, HDD 205, NVRAM 210, image processing unit 206, printer 211, scanner 212, and operation unit 213 is interrupted. At this time, the switch 308 is set in the ON state and the remaining switches are set in the OFF state. Since power supply to the units except for the communication unit 220 and RAM 204 is interrupted, the power saving mode is a power mode in which the power consumption is smaller than that in the normal power mode.

Note that the arrangement, shown in FIG. 3, of the switches and power supply lines to the respective portions is merely an example, and the present invention is not limited to this. For example, if another power mode is used, the switches may be switched according to the power mode. Furthermore, another arrangement of the power supply groups of the respective portions may be used. In this embodiment, in the power saving mode, the power consumption of the overall information processing apparatus 101 is suppressed by supplying power to only the communication unit 220 and RAM 204.

If the information processing apparatus 101 operates in the power saving mode, the communication unit 220 executes processing for a packet transmitted by the external apparatus such as the PC 102, instead of the controller 200. At this time, the communication unit 220 decides processing for the received packet based on a proxy response pattern including an SNMP response information table (to be described later) and a WOL (Wake On LAN) pattern. The proxy response pattern and WOL pattern will be described later with reference to FIGS. 7 and 8.

[Example of Data Structure of SNMP Message]

FIG. 4 is a table showing an example of the data structure of an SNMP message. A PDU (Protocol Data Unit) 400 is the basic data unit of the SNMP. A PDU type field 401 is an area where an ID indicating the type of an SNMP command is set. For example, in SNMP version 1 (to be referred to as SNMPv1 hereinafter), "GetRequest", "GetNextRequest", "SetRequest", "GetResponse", and "Trap" are defined as PDU types. Among them, "SetRequest" and "Trap" are not used in this embodiment and a description thereof will be omitted. The PDU types "GetRequest" and "GetNextRequest" indicate status obtaining requests, and the PDU type "GetResponse" indicates a response to a status obtaining request.

A request ID field 402 is an area where a request ID for uniquely identifying a request from the SNMP manager and a response from the SNMP agent is stored. An error status field 403 is an area where a code indicating a reason why the SNMP agent cannot normally return a response to an SNMP request from the SNMP manager. Representative error statuses in SNMPv1 are as follows. Note that "noError" is set in the error status field 403 for PDUs except for those with the PDU type "GetResponse".

(1) noError: normal end
(2) noSuchName: a MIB object requested by an SNMP request is not implemented.

An error index field 404 is an area where an error index is stored. In the SNMP PDU 400, it is possible to designate a plurality of MIB objects in a variable binding list (VBL) field 405. As an error index stored in the error index field 404, a largest value indicating a MIB object, for which an error has occurred, among the MIB objects is stored. If the error status is "noError", "0" is set in the error index. One or more MIB OIDs and information of the values are stored in the variable binding list (VBL) field 405. A value obtained by adding an instance identifier to an actual OID assigned to each MIB object is stored in each of OID fields 406, 408, and 410. If the MIB object has only a single value, "0" is set as the instance identifier. If the MIB object has a plurality of values in a table format, numbers of "1" or more which are not necessarily successive are set for the respective values of the table. The SNMP agent stores values linked with the OID fields 406, 408, and 410 managed by the MIB in value fields 407, 409, and 411. If the PDU type is "GetRequest" or "GetNextRequest" indicating an obtaining request, "0" is stored in the value fields.

[Example of MIB]

Figures 5A, 5B:
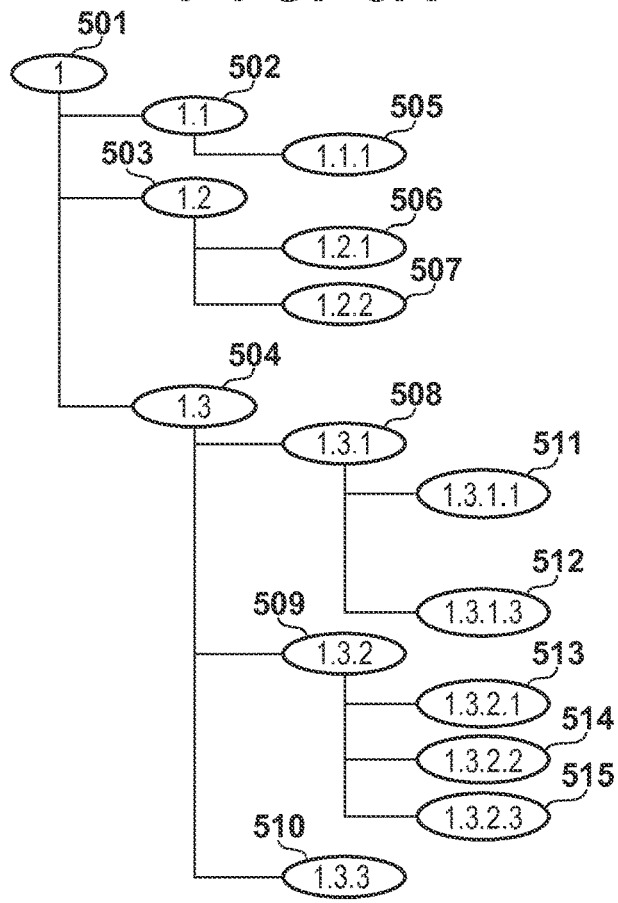
FIGS. 5A and 5B are views showing a MIB implemented by the information processing apparatus.

FIGS. 5A and 5B show a practical example of the MIB implemented by the information processing apparatus 101 according to this embodiment. FIG. 5A shows the tree information of the MIB managed by the information processing apparatus 101. The arrangement of the MIB is expressed by a tree structure, and each node is called a MIB object. Each MIB object is assigned with an ID (identification information) called an object ID (OID). The OID can be processed as a management item of a setting value for each function, and expressed by a branch number assigned for each layer of the tree structure. For example, the OID of a MIB object 505 is expressed as "1.1.1". The SNMP manager obtains information of the device and requests to change the setting by designating the OID for the SNMP agent.

FIG. 5B shows an implementation value list 520 of the respective MIB objects of the information processing apparatus 101. The MIB objects 505, 506, 507, 510, 511, 512, 513, 514, and 515 are leaf nodes, and implementation values shown in the implementation value list 520 are implemented. A MIB object 501 corresponding to a root node and MIB objects 502, 503, 504, 508, and 509 corresponding to internal nodes have no values, and only exist by definition. In this embodiment, the MIB of the information processing apparatus 101 is loaded into the RAM 204 in the tree structure based on information such as a device arrangement detected by the CPU 201 from the printer I/F 207 or the like at the time of activation, and setting values read out by the CPU 201 from a memory such as the ROM 203. The leaf nodes of the MIB tree increase or decrease depending on the device arrangement and settings of the information processing apparatus 101. For example, as for the paper feed units of the printer, MIB objects of leaf nodes the number of which is equal to that of connected paper feed units are generated.

An operation when the SNMP agent receives an SNMP request will be described by exemplifying the information processing apparatus 101 implementing the MIB shown in FIGS. 5A and 5B. A case in which the information processing apparatus 101 receives a GetRequest packet for an OID "1.2.1.0" is received will be explained. Note that "0" at the end of the OID corresponds to an instance identifier, and thus the OID "1.2.1.0" indicates the MIB object 506 shown in FIG. 5A. As shown in FIG. 5B, "b" is implemented as a value in the MIB object 506, and thus the information processing apparatus 101 returns a GetResponse packet in response to the GetRequest packet by setting "b" as the value of "1.2.1.0".

A case in which the information processing apparatus 101 receives a GetNextRequest packet for an OID "1.3.1" indicating the MIB object 508 will be described. The GetNextRequest packet is a request to request an instance next to the designated MIB object. In this embodiment, therefore, "0" as an instance identifier is not added to an OID designated in the GetNextRequest packet. Based on FIG. 5B, the information processing apparatus 101 returns, as a GetResponse packet, an OID "1.3.1.1.0" indicating the MIB object 511 as a leaf node next to the MIB object 508 and its value "d".

The GetNextRequest packet is a request to request a leaf node implemented by the SNMP agent and positioned next to the designated OID on the MIB tree, and the value of the leaf node. In the example shown in FIGS. 5A and 5B, therefore, within the range from "1.2.2" to "1.3.1", there are a plurality of OIDs designated in the GetNextRequest packet to which the information processing apparatus 101 should return the OID "1.3.1.1.0" and its value "d" as a response. For example, if a GetNextRequest packet for an OID "1.2.3" which is not implemented is received, the information processing apparatus 101 returns, as a GetResponse packet, the OID "1.3.1.1.0" implemented next to "1.2.3" in the tree structure of the MIB and its value "d".

Next, a case in which the information processing apparatus 101 receives a GetRequest packet for the OIDs "1.2.1.0" (the MIB object 506) and "1.3.1.1.0" (the MIB object 511) will be explained. Both the MIB objects 506 and 511 are implemented by the information processing apparatus 101, the information processing apparatus 101 returns, as a GetResponse packet, the OIDs "1.2.1.0" and "1.3.1.1.0" and their values "b" and "d".

Lastly, a case in which the information processing apparatus 101 receives a GetRequest packet for OIDs "1.2.3.0" and "1.3.1.2.0" will be described. Neither the OID "1.2.3.0" nor the OID "1.3.1.2.0" is implemented by the information processing apparatus 101. Consequently, the information processing apparatus 101 returns an error (noSuchName) as a GetResponse packet.

[Transition of Power Mode]

Figure 6:
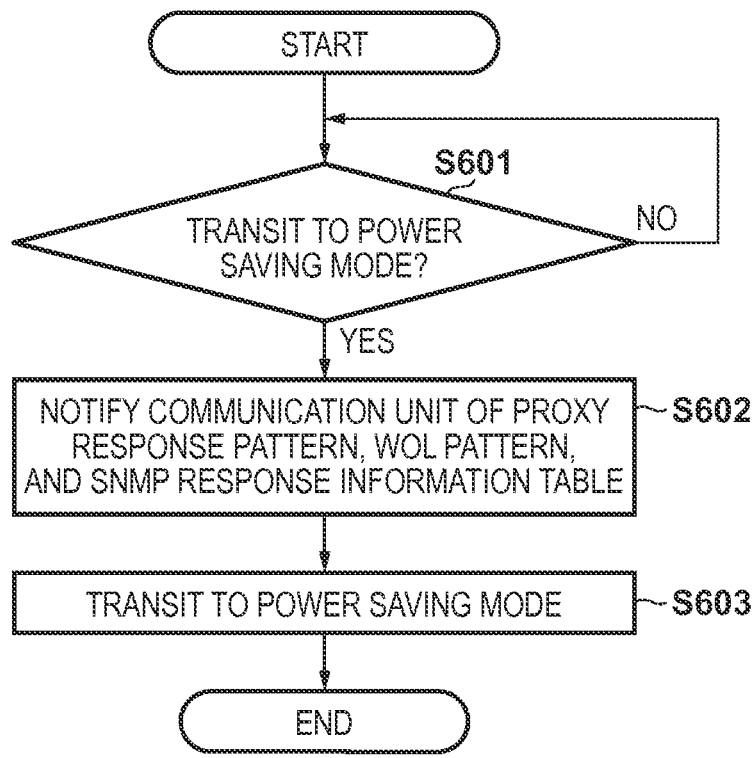
FIG. 6 is a flowchart illustrating power mode transition processing by the information processing apparatus.

Transition of the information processing apparatus 101 to the power saving mode will be described with reference to FIG. 6. Upon detecting that a condition for transiting to the power saving mode is satisfied, the information processing apparatus 101 currently operating in the normal power mode transits to the power saving mode. Each step shown in the flowchart of FIG. 6 is processed when the CPU 201 of the controller 200 loads a program stored in a memory such as the ROM 203 into the RAM 204, and executes it. Processing shown in the flowchart of FIG. 6 is executed when the information processing apparatus 101 operates in the normal power mode.

In step S601, the CPU 201 determines whether to transit from the normal power mode to the power saving mode. In this embodiment, if the CPU 201 detects that the condition for transiting to the power saving mode is satisfied (YES in step S601), it determines to transit from the normal power mode to the power saving mode, and the process advances to step S602. On the other hand, if the CPU 201 does not detect that the condition for transiting to the power saving mode is satisfied (NO in step S601), it determines not to transit from the normal power mode to the power saving mode, and stands by until it is detected that the condition for transiting to the power saving mode is satisfied. Note that examples of the condition for transiting to the power saving mode are a condition in which no print job has been input to the information processing apparatus 101 for a predetermined time (for example, 5 min) and a condition in which the user inputs, via the operation unit 213, an instruction to transit to the power saving mode. The present invention, however, is not limited to them.

In step S602, the CPU 201 notifies, via the expansion I/F 202, the communication unit 220 of the proxy response pattern and WOL pattern stored in advance in the NVRAM 210. The communication unit 220 stores the notified proxy response pattern and WOL pattern in the NVRAM 227.

Figure 7:
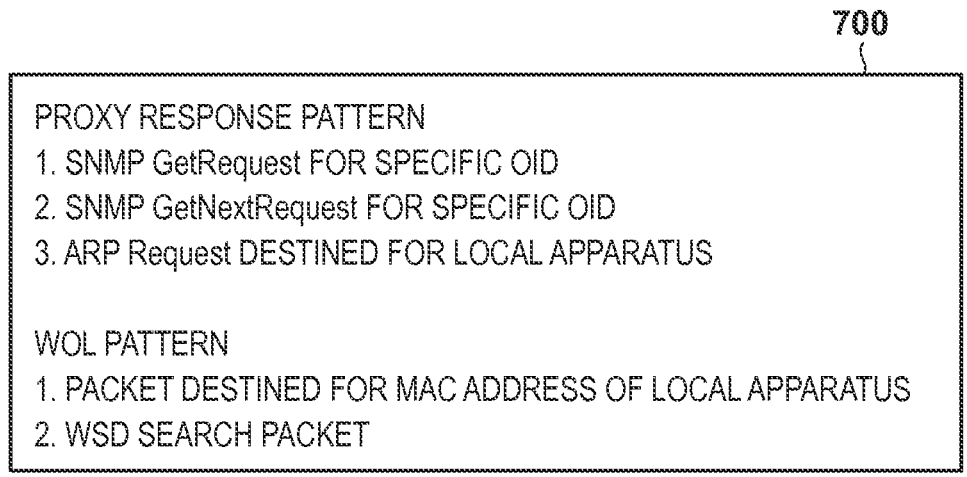
FIG. 7 is a view showing examples of a proxy response pattern and WOL pattern.

FIG. 7 shows practical examples of the proxy response pattern and WOL pattern according to this embodiment. The proxy response patterns and WOL patterns shown in FIG. 7 are stored in advance in the NVRAM 210. The proxy response pattern indicates the pattern of a packet to be used by the communication unit 220 to respond to a received packet associated with one of various requests, instead of the controller 200. Responding to a received packet by the communication unit 220 instead of the controller 200 will be referred to as a "proxy response" hereinafter. With the proxy response, it is possible to respond to a received packet while maintaining the power saving state of the information processing apparatus 101 as a whole, that is, while maintaining the power saving mode without activating the controller 200.

In the example shown in FIG. 7, three patterns are stored as proxy response patterns. The first pattern is an SNMP GetRequest packet for a specific OID. The second pattern is an SNMP GetNextRequest packet for a specific OID. The third pattern is an ARP (Address Resolution Protocol) Request packet destined for the local apparatus. The GetRequest packet is a request to request the status of the information processing apparatus 101. A concrete status to be requested is designated by the OID contained in the request. In this embodiment, a proxy response is sent when all OIDs designated in the VBL field 405 of the SNMP packet exist in the OID list of an SNMP response information table 800 (to be described alter with reference to FIG. 8). Similarly to the GetRequest packet, the GetNextRequest packet is a request to request the status of the information processing apparatus 101. A concrete status to be requested is designated by the OID contained in the request. In this embodiment, a proxy response is sent when all OIDs designated in the VBL field 405 of the SNMP packet fall within the GetNextRequest OID range of the SNMP response information table 800.

The WOL pattern will be explained. The WOL pattern indicates a pattern which requires the information processing apparatus 101 to transit from the power saving mode to the normal power mode. If the received packet matches the WOL pattern, the communication unit 220 notifies, via the expansion I/F 222, the power control unit 300 of a transition instruction to transit from the power saving mode to the normal power mode. Under the control of the power control unit 300, the information processing apparatus 101 transits from the power saving mode to the normal power mode. Upon transiting to the normal power mode, the received packet is transferred from the communication unit 220 to the controller 200, and the controller 200 executes processing (for example, print processing based on a print job) for the received packet. In the example shown in FIG. 7, two patterns are stored as WOL patterns. The first pattern is "packet destined for MAC address of local apparatus". The second pattern is "WSD search packet". WSD (Web Services on Device) is a well-known technique and a description thereof will be omitted. The above proxy response patterns and WOL patterns are merely examples, and other packets may be added as targets.

[Proxy Response Processing]

Proxy responses to an SNMP GetRequest packet and an SNMP GetNextRequest packet in the information processing apparatus 101 according to the embodiment will be described with reference to FIGS. 8 to 10.

(SNMP Response Information Table)

FIG. 8 shows an example of the structure of the SNMP response information table according to this embodiment. In the SNMP response information table 800, pieces of response information each formed from a first GetNextRequest OID 801, last GetNextRequest OID 802, OID 804, implementation value 805, and implementation presence/absence 806 are listed. That is, the SNMP response information table 800 is obtained by arranging some of pieces of management information managed by the controller 200 and shown in FIGS. 5A and 5B as a table managed by the communication unit 220. The OID 804 stores an OID for which the communication unit 220 sends a proxy response when a status request is sent as a GetRequest packet. The implementation value 805 stores the implementation value of the OID 804 if the OID is implemented by the information processing apparatus 101. The implementation presence/absence 806 stores information indicating whether the OID 804 is implemented by the information processing apparatus 101. The first GetNextRequest OID 801 indicates an OID positioned at the top of the MIB tree, among OIDs for which when designated in a GetNextRequest packet, the information processing apparatus 101 responds using the corresponding OID 804 and implementation value 805. The last GetNextRequest OID 802 indicates an OID positioned at the end of the MIB tree, among OIDs for which when designated in a GetNextRequest packet, the information processing apparatus 101 responds using the corresponding OID 804 and implementation value 805. A combination of the first GetNextRequest OID 801 and last GetNextRequest OID 802 indicates a GetNextRequest OID range 803.

As described with reference to FIGS. 5A and 5B, the MIB of the information processing apparatus 101 changes depending on the device arrangement and settings of the information processing apparatus 101. That is, the implementation presence/absence of the OID 804 of the SNMP response information table 800 and the GetNextRequest OID range may change depending on the device arrangement and settings of the information processing apparatus 101. Therefore, the SNMP response information table 800 needs to be generated upon completion of activation of the information processing apparatus 101 and confirmation of the device arrangement and settings. In this embodiment, the SNMP response information table 800 shown in FIG. 8 is generated by the CPU 201 at the time of activation of the information processing apparatus 101, and loaded into the RAM 204. The present invention, however, is not limited to this timing, and the SNMP response information table 800 may be generated when the arrangement of the information processing apparatus is changed. SNMP response information table generation processing will be described later with reference to FIG. 9.

A practical example of a proxy response by the communication unit 220 to an SNMP status request for the OID included in the SNMP response information table 800 when the information processing apparatus 101 operates in the power saving mode will be explained. A case in which the communication unit 220 receives a GetRequest packet for the OID "1.2.1.0" will be described. Note that since "0" at the end of the OID corresponds to an instance identifier, the OID "1.2.1.0" indicates "1.2.1" listed in the OID 804 of the SNMP response information table 800. With reference to the SNMP response information table 800, the implementation value of the OID "1.2.1" is "b". In response to the received GetRequest packet, the communication unit 220 sends, as a proxy response, a GetResponse packet obtained by storing "1.2.1" in the OID field of the VBL field 405 shown in FIG. 4, and further storing "b" in the value field.

A case in which the communication unit 220 receives a GetNextRequest packet in which the OID "1.1.2" is designated will be explained. The OID "1.1.2" is an OID falling within the GetNextRequest OID range 803 of response information 810 listed in the SNMP response information table 800. With reference to the SNMP response information table 800, an OID to be used to respond to the GetNextRequest packet in which the OID falling within the GetNextRequest OID range 803 of the response information 810 is designated is the OID "1.2.1", and the implementation value is "b". In response to the received GetNextRequest packet, the communication unit 220 sends, as a proxy response, a GetResponse packet obtained by storing "1.2.1" in the OID field of the VBL field 405 shown in FIG. 4, and further storing "b" in the value field.

A case in which the communication unit 220 receives a GetRequest packet for the OID "1.2.3.0" will be described. Note that "0" at the end of the OID corresponds to an instance identifier, and thus the OID "1.2.3.0" indicates "1.2.3" listed in the OID 804 of the SNMP response information table 800. With reference to the SNMP response information table 800, the OID "1.2.3" is not implemented by the information processing apparatus 101. In response to the received GetRequest packet, therefore, the communication unit 220 sends, as a proxy response, a GetResponse packet indicating an error (noSuchName).

(Table Generation Processing)

Figure 9:
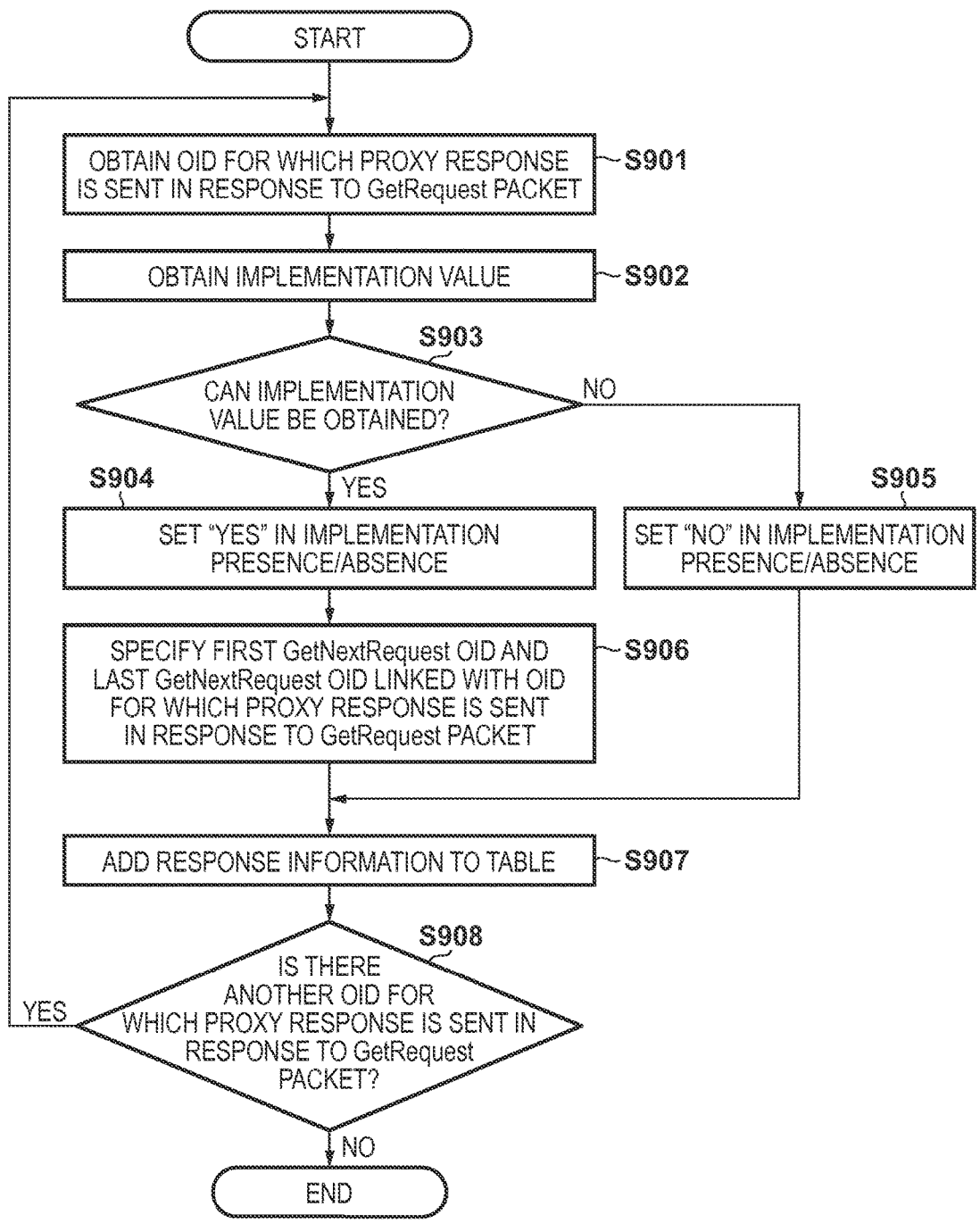
FIG. 9 is a flowchart illustrating SNMP response information table generation processing according to the first embodiment.

FIG. 9 is a flowchart illustrating SNMP response information table generation processing according to this embodiment. Processing shown in each step of FIG. 9 is processed when the CPU 201 of the controller 200 loads a program stored in a memory such as the ROM 203 into the RAM 204, and executes it.

In step S901, the CPU 201 obtains an OID, for which a proxy response should be sent in response to a GetRequest packet, from a list of OIDs for which the information processing apparatus 101 sends a proxy response in response to a GetRequest packet. The list of OIDs for which the information processing apparatus 101 sends a proxy response to a GetRequest packet is stored in advance in the NVRAM 210.

In step S902, the CPU 201 obtains an implementation value corresponding to the OID obtained in step S901 from the MIB tree loaded into the RAM 204. In step S903, the CPU 201 determines the obtaining result in step S902. If the implementation value can be obtained (YES in step S903), the CPU 201 sets, in step S904, "YES" as the value of the implementation presence/absence 806 of the OID whose implementation value can be obtained, and the process advances to step S906. On the other hand, if the implementation value cannot be obtained (NO in step S903), the CPU 201 sets, in step S905, "NO" as the value of the implementation presence/absence 806 of the OID whose implementation value cannot be obtained, and the process advances to step S907. In this embodiment, GetNextRequest OID information of the OID having "NO" as the value of the implementation presence/absence 806 has no value.

In step S906, the CPU 201 specifies the first OID and last OID within the GetNextRequest OID range linked with the OID whose implementation value can be obtained from the MIB tree loaded into the RAM 204. With the above-described procedure, response information of the SNMP response information table 800 formed by the first GetNextRequest OID 801, last GetNextRequest OID 802, OID 804, implementation value 805, and implementation presence/absence 806 is generated.

In step S907, the CPU 201 adds the response information to the SNMP response information table 800. In step S908, the CPU 201 determines whether an OID which has not been added to the SNMP response information table 800 exists in the list of OIDs for which a proxy response is sent. If there is an OID which has not been added to the SNMP response information table 800 (YES in step S908), the process returns to step S901 and the CPU 201 repeats the processing. If there is no OID which has not been added to the SNMP response information table 800 (NO in step S908), the SNMP response information table generation processing ends.

(Proxy Response Processing)

Figure 10:
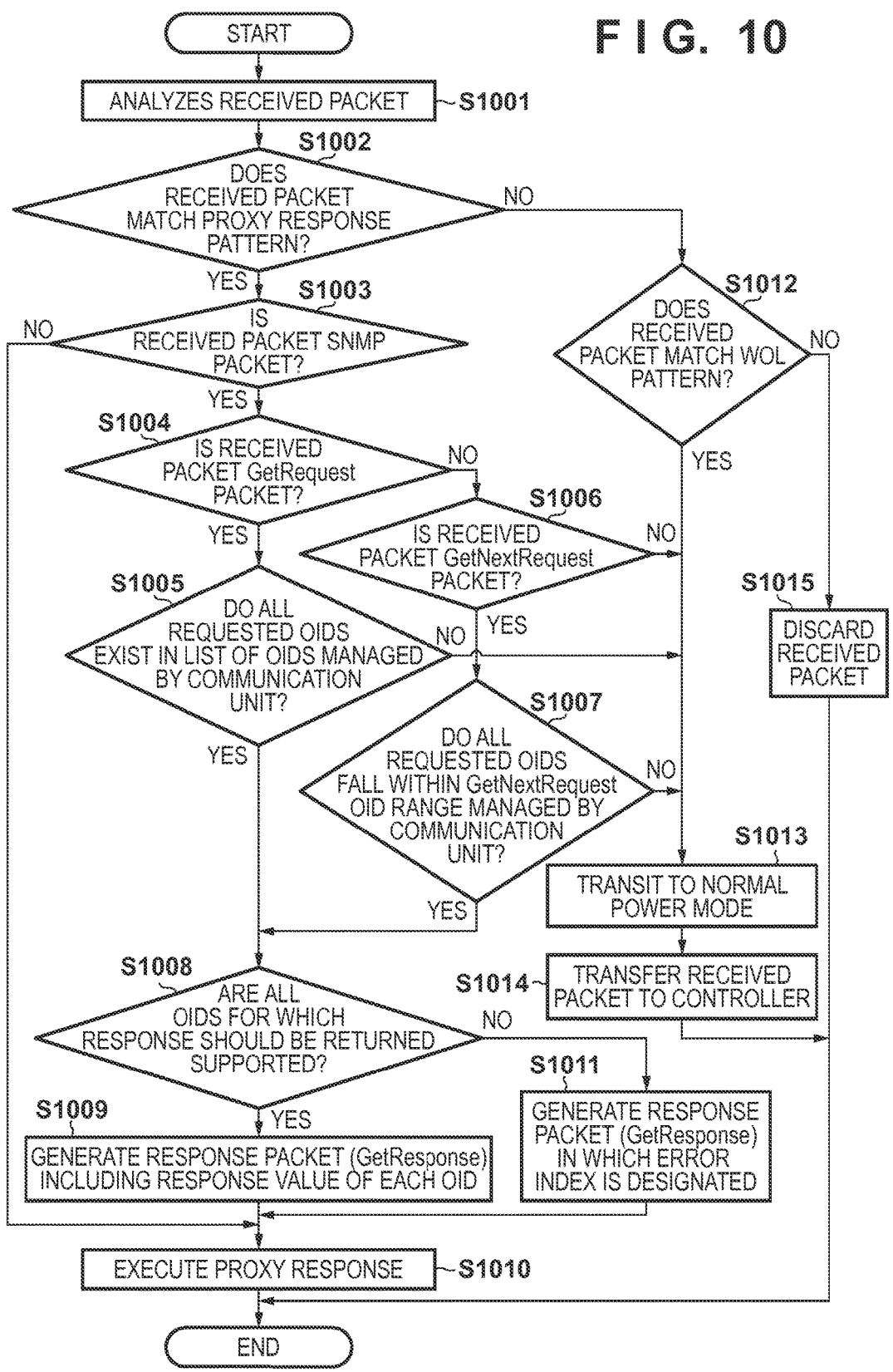
FIG. 10 is a flowchart illustrating processing of a communication unit in the power saving mode according to the first embodiment.

FIG. 10 is a flowchart illustrating processing executed when the communication unit 220 receives a packet transmitted by the external apparatus while the information processing apparatus 101 operates in the power saving mode. Processing shown in each step of FIG. 10 is processed when the CPU 221 of the communication unit 220 loads a program stored in a memory such as the ROM 223 into the RAM 224, and executes it.

When the communication unit 220 receives a packet transmitted by the external apparatus such as the PC 102, the CPU 221 analyzes the received packet in step S1001. In step S1002, the CPU 221 determines whether the received packet matches the proxy response pattern shown in FIG. 7. If the received packet matches the proxy response pattern (YES in step S1002), the process advances to step S1003; otherwise (NO in step S1002), the process advances to step S1012.

In step S1012, the CPU 221 determines whether the received packet matches the WOL pattern shown in FIG. 7. If the received packet matches the WOL pattern (YES in step S1012), the process advances to step S1013. In step S1013, the CPU 221 controls the information processing apparatus 101 to transit from the power saving mode to the normal power mode, and the process advances to step S1014. More specifically, the power control unit 300 is notified, via the expansion I/F 202, of a transition instruction to transit to the normal power mode, and causes the information processing apparatus 101 to transit from the power saving mode to the normal power mode. In step S1014, the CPU 221 transfers the received packet to the CPU 201 via the expansion I/F 202. Then, the processing sequence ends. Note that the transferred packet is processed under the control of the CPU 201 (controller 200).

On the other hand, if the received packet does not match the WOL pattern (NO in step S1012), the process advances to step S1015. In step S1015, the CPU 221 discards the received packet, and maintains the power saving mode. After that, the processing sequence ends.

In step S1003, the CPU 221 determines whether the received packet is an SNMP packet. If the received packet is an SNMP packet (YES in step S1003), the process advances to step S1004; otherwise (NO in step S1003), the CPU 221 executes a proxy response while maintaining the power saving mode in step S1010.

In step S1004, the CPU 221 determines whether the received packet is a GetRequest packet. If the received packet is a GetRequest packet (YES in step S1004), the process advances to step S1005; otherwise (NO in step S1004), the process advances to step S1006.

In step S1005, the CPU 221 determines whether all OIDs requested by the GetRequest packet as the received packet exist in the OIDs 804 of the SNMP response information table 800 shown in FIG. 8. If all the OIDs requested by the GetRequest packet exist in the OIDs 804 of the SNMP response information table 800 (YES in step S1005), the process advances to step S1008; otherwise, the process advances to step S1013.

In step S1006, the CPU 221 determines whether the received packet is a GetNextRequest packet. If the received packet is a GetNextRequest packet (YES in step S1006), the process advances to step S1007; otherwise (NO in step S1006), the process advances to step S1013.

In step S1007, the CPU 221 determines whether all OIDs requested by the GetNextRequest packet as the received packet fall within the GetNextRequest OID range 803 of response information included in the SNMP response information table 800. If all the OIDs designated in the GetNextRequest packet fall within the GetNextRequest OID range 803 of each piece of response information (YES in step S1007), the process advances to step S1008; otherwise (NO in step S1007), the process advances to step S1013.

In step S1008, based on the implementation presence/absence 806 of the SNMP response information table 800, the CPU 221 determines whether all the OIDs for which a response should be returned in response to the GetRequest or GetNextRequest packet are implemented by the information processing apparatus 101. More specifically, the CPU 221 performs the determination processing based on the contents of the implementation presence/absence 806 linked with each of the OIDs which exist in the OIDs 804 and for which a response should be returned in response to the GetRequest or GetNextRequest packet as the received packet. If all the OIDs for which a response should be returned are implemented by the information processing apparatus 101 (YES in step S1008), the process advances to step S1009; otherwise (NO in step S1008), the process advances to step S1011.

In step S1009, the CPU 221 generates a GetResponse packet in which each OID and its implementation value are stored in the VBL field 405, and the process advances to step S1010. In proxy response processing in step S1010, the CPU 221 transmits the GetResponse packet generated in step S1009 to the request source while maintaining the power saving mode.

In step S1011, the CPU 221 stores, in the error index field 404, information indicating the ordinal number of an OID, in the VBL field 405 of the received packet, which is not implemented by the information processing apparatus 101, among the OIDs designated in the received packet. Furthermore, the CPU 221 generates a GetResponse packet indicating an error (noSuchName), and the process advances to step S1010. In the proxy response processing in step S1010, the CPU 221 transmits the GetResponse packet generated in step S1011 to the request source while maintaining the power saving mode. The processing sequence then ends.

According to this embodiment, it is possible to maintain the power saving mode of the information processing apparatus even when a request is received from the external apparatus. Especially, even when an SNMP GetNextRequest packet is received, it is possible to return a response while maintaining the power saving mode of the information processing apparatus.

Second Embodiment

In the first embodiment, the arrangement in which the SNMP response information table having the GetNextRequest OID range as a component of response information is used has been explained. To the contrary, in the second embodiment, an arrangement in which an SNMP response information table having a specific OID as a GetNextRequest OID serving as a component of response information is used will be described.

(SNMP Response Information Table)

FIG. 11 practically shows an SNMP response information table according to this embodiment. In this embodiment, among the components of an SNMP response information table 1100, a GetNextRequest OID 1101, an OID 1102, and implementation presence/absence 1104 are stored in advance in an NVRAM 210 of an information processing apparatus 101.

Upon completion of activation of the information processing apparatus 101, a CPU 201 performs processing of obtaining the implementation value of the OID 1102, generates the SNMP response information table 1100, and loads it into a RAM 204. The GetNextRequest OID 1101 indicates an OID for which a communication unit 220 performs a proxy response when the OID is designated in a GetNextRequest packet. The OID 1102 indicates an OID for which the communication unit 220 performs a proxy response when a status request is sent using a GetRequest packet. The OID 1102 indicates the OID of an instance next to the OID listed in the GetNextRequest OID 1101. That is, the OID 1102 also indicates an OID for which a response should be returned in response to a GetRequest packet. An implementation value 1103 stores the implementation value of the OID 1102 when the OID 1102 is implemented by the information processing apparatus 101. The implementation presence/absence 1104 stores information indicating whether the OID 1102 is implemented by the information processing apparatus 101.

A practical example of a proxy response by the communication unit 220 to an SNMP status request for the OID included in the SNMP response information table when the information processing apparatus 101 operates in the power saving mode will be described with reference to FIG. 11. Note that a response to a GetRequest packet and a response to a request for an OID which is not implemented have the same arrangements as those described in the first embodiment and a description thereof will be omitted.

A case in which the communication unit 220 receives a GetNextRequest packet for an OID "1.1" will be described. The OID "1.1" is listed in the GetNextRequest OID 1101 of the SNMP response information table 1100. With reference to the SNMP response information table 1100, an OID to be used for a response to the GetNextRequest packet for the OID "1.1" is an OID "1.1.1" and its implementation value is "a". Therefore, in response to the received GetNextRequest packet, the communication unit 220 sends, as a proxy response, a GetResponse packet obtained by storing "1.1.1" in the OID field of a VBL field 405 and storing "a" in the value field of the VBL field 405.

(Proxy Response Processing)

Figure 12:
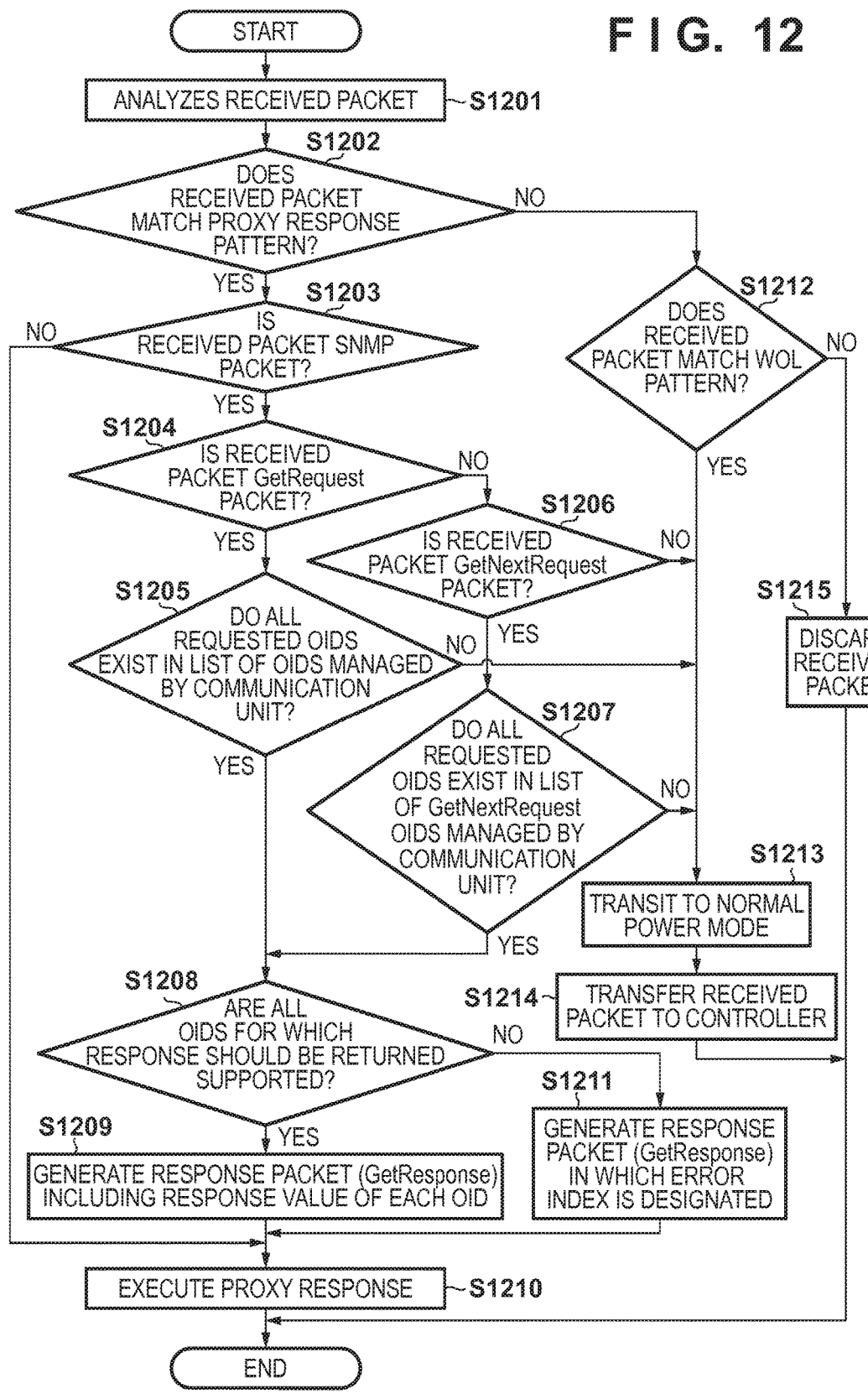
FIG. 12 is a flowchart illustrating processing of a communication unit in the power saving mode according to the second embodiment.

FIG. 12 is a flowchart illustrating processing executed when the communication unit 220 receives a packet transmitted by an external apparatus while the information processing apparatus 101 operates in the power saving mode. Processing shown in each step of the flowchart of FIG. 12 is processed when a CPU 221 of the communication unit 220 loads a program stored in a memory such as a ROM 223 into a RAM 224, and executes it. Note that by comparing a processing sequence shown in FIG. 12 according to this embodiment with that shown in FIG. 10 described in the first embodiment, only processes in step S1207 and S1007 are different from each other. That is, processes in steps S1201 to S1206 and S1208 to S1215 of FIG. 12 are the same as those in steps S1001 to S1006 and S1008 to S1015 of FIG. 10, respectively. Only the difference will be explained and a description of the remaining processes will be omitted.

If the received packet is a GetNextRequest packet (YES in step S1206), the CPU 221 determines in step S1207 whether all OIDs requested by the GetNextRequest packet as the received packet exist in the GetNextRequest OIDs 1101 of the SNMP response information table 1100. If all the OIDs designated in the GetNextRequest packet exist in the GetNextRequest OID 1101 of the SNMP response information table 1100 (YES in step S1207), the process advances to step S1208; otherwise (NO in step S1207), the process advances to step S1213.

According to this embodiment, it is possible to return a response to an SNMP GetNextRequest packet while maintaining the power saving mode of the information processing apparatus. As compared with the first embodiment, it is possible to reduce the size of the SNMP information table held by the communication unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104513, filed May 20, 2014, which is hereby incorporated by reference herein in its entirety.

What is claimed is:

1. An information processing apparatus which comprises a controller including a first CPU, and a communication section including a second CPU, and can operate in a first power mode in which power is supplied to the second CPU and power is not supplied to at least the first CPU, and in a second power mode in which power is supplied to at least the first CPU and the second CPU, wherein
the communication section comprises:
a memory that stores instructions that, when executed by the second CPU, cause the communication section to function as
a holding unit configured to hold at least a piece of management information of the information processing apparatus managed by the controller; and
a response unit configured, when operating in the first power mode, to respond using management information held by the holding unit in substitution for the controller in response to a request from an external apparatus, wherein if a request from the external apparatus is GetNextRequest of SNMP (Simple Network Management Protocol) and an object ID designated by the GetNextRequest matches the GetNextRequest object ID information held by the holding unit, the response unit responds using the object ID information corresponding to the GetNextRequest object ID information and an implementation value corresponding to the object ID information,
wherein, when operating in the second power mode, in the management information managed by the controller, object ID information of MIB (Management Information Base) and an implementation value corresponding to the object ID information are corresponded to GetNextRequest object ID information and held, and
a correspondence to the GetNextRequest object ID information is generated upon generation of the MIB at the time of activation of the information processing apparatus or is updated upon updating of the MIB when a device arrangement and a setting of the information processing apparatus is changed.

2. The information processing apparatus according to claim 1, wherein, if the request from the external apparatus is GetRequest of SNMP and an object ID designated by the GetRequest matches the object ID information held by the holding unit, the response unit responds using the object ID information and an implementation value corresponding to the object ID information.

3. The information processing apparatus according to claim 1, wherein, if an object ID designated by the GetNextRequest from the external apparatus is not held by the holding unit, the information processing apparatus transits to the second power mode, and the controller responds for the GetNextRequest.

4. The information processing apparatus according to claim 1, wherein power consumption in the first power mode is lower than that in the second power mode.

5. The information processing apparatus according to claim 1, wherein the holding unit further holds first information indicating a condition for transiting to the second power mode, and when receiving a request which is matches the condition indicated by the first information, the information processing apparatus transits from the first power mode to the second power mode.

6. The information processing apparatus according to claim 5, wherein
the holding unit further holds second information indicating a condition for responding by the communication section in substitution for the controller, and
the response unit further discards the request, if the request from the external apparatus does not match any of the first and second information.

7. The information processing apparatus according to claim 1, wherein in the management information held by the holding unit, one or a plurality of GetNextRequest object ID information is corresponded to object ID information and an implementation value corresponding to the object ID information.

8. The information processing apparatus according to claim 1, wherein the controller includes a memory storing instructions that, when executed by the first CPU, cause the controller to perform functions of a generation unit configured to generate management information held by the holding unit of the communication section.

9. The information processing apparatus according to claim 8, wherein the generation unit performs generation when the information processing apparatus starts.

10. The information processing apparatus according to claim 1, wherein in the management information held by the holding unit, information indicating whether a MIB object corresponding to an object ID is implemented is corresponded and held, and
if an object ID designated by the GetNextRequest from the external apparatus matches the GetNextRequest object ID information held by the holding unit and a MIB object corresponding to the object ID information corresponding to the GetNextRequest object ID information is not implemented, the response unit responds information indicating that the MIB object is not implemented.

11. A control method for an information processing apparatus which comprises a controller including a first CPU, and a communication section including a second CPU, and can operate in a first power mode in which power is supplied to the second CPU and power is not supplied to at least the first CPU, and in a second power mode in which power is supplied to at least the first CPU and the second CPU, the communication section comprises a memory storing instructions that, when executed by the second CPU, cause the communication section to function as a holding unit configured to hold at least a piece of management information of the information processing apparatus managed by the controller, wherein the method comprises:
in the communication section,
responding, when operating in the first power mode, using management information held by the holding unit in substitution for the controller in response to a request from an external apparatus, wherein if a request from the external apparatus is GetNextRequest of SNMP (Simple Network Management Protocol) and an object ID designated by the GetNextRequest matches the GetNextRequest object ID information held by the holding unit, the response unit responds using the object ID information corresponding to the GetNextRequest object ID information and an implementation value corresponding to the object ID information,
wherein, when operating in the second power mode, in the management information managed by the controller, object ID information of MIB (Management Information Base) and an implementation value corresponding to the object ID information are corresponded to GetNextRequest object ID information and held, and
a correspondence to the GetNextRequest object ID information is generated upon generation of the MIB at the time of activation of the information processing apparatus or is updated upon updating of the MIB when a device arrangement and a setting of the information processing apparatus is changed.

12. A non-transitory computer-readable medium storing a program for causing a computer to control an information processing apparatus comprising a controller including a first CPU, and a communication section including a second CPU, and can operate in a first power mode in which power is supplied to the second CPU and power is not supplied to at least the first CPU, and in a second power mode in which power is supplied to at least the first CPU and the second CPU, wherein the program causes the communication section to function as:
a holding unit configured to hold at least a piece of management information of the information processing apparatus managed by the controller; and
a response unit configured, when operating in the first power mode, to respond using management information held by the holding unit in substitution for the controller in response to a request from an external apparatus, wherein if a request from the external apparatus is GetNextRequest of SNMP (Simple Network Management Protocol) and an object ID designated by the GetNextRequest matches the GetNextRequest object ID information held by the holding unit, the response unit responds using the object ID information corresponding to the GetNextRequest object ID information and an implementation value corresponding to the object ID information,
wherein, when operating in the second power mode, in the management information managed by the controller, object ID information of MIB (Management Information Base) and an implementation value corresponding to the object ID information are corresponded to GetNextRequest object ID information and held, and
a correspondence to the GetNextRequest object ID information is generated upon generation of the MIB at the time of activation of the information processing apparatus or is updated upon updating of the MIB when a device arrangement and a setting of the information processing apparatus is changed.

* * * * *